United States Patent [19]

Hlinsky

[11] 3,957,078

[45] May 18, 1976

[54] WASP EXCLUDER AND EXHAUST PORT PROTECTOR FOR AIR BRAKES

[75] Inventor: Emil J. Hlinsky, Oak Brook, Ill.

[73] Assignee: MacLean-Fogg Lock Nut Company, Mundelein, Ill.

[22] Filed: June 13, 1974

[21] Appl. No.: 479,040

[52] U.S. Cl. ............................................ 137/525.1
[51] Int. Cl.² ........................................ F16K 15/14
[58] Field of Search............. 137/525.1, 525.3, 377, 137/115, 505.11

[56] References Cited
UNITED STATES PATENTS

| | | | |
|---|---|---|---|
| 571,708 | 11/1896 | Thompson | 137/525.1 |
| 2,128,050 | 8/1938 | Landis | 137/377 X |
| 2,659,442 | 11/1953 | Sutliff | 137/525.1 X |
| 2,670,757 | 3/1954 | Delaney | 137/525.1 X |
| 2,822,819 | 2/1958 | Geeraert | 137/525.1 |
| 2,973,230 | 2/1961 | Eastburg | 137/525.1 X |
| 3,201,284 | 8/1965 | Ellis | 137/525.1 X |
| 3,422,844 | 1/1969 | Grise | 137/525.1 |

*Primary Examiner*—William R. Cline
*Attorney, Agent, or Firm*—McCaleb, Lucas & Brugman

[57] ABSTRACT

A wasp excluder and exhaust port protector for railway air brake systems. A housing adapted to be screw connected to the exhaust port of an air brake system has a cylindrical bore in the outlet end portion. A valve having a unitary body of rubber-like material is wholly contained within the bore to provide mechanical protection for it. The body has a ring portion slidably fitted within the bore and sealed against a seat within the housing. The valve body has a disc portion integral with the ring and formed with a plurality of internally concave, externally convex, radially extending hollow ribs. The ribs have radial slits extending along the middle portions of the ribs and meeting in the center of the disc portion to define a plurality of elastic sectors connected to the ring portion. By this construction the walls of the hollow ribs provide reinforcing ridges along the edges of the sectors to maintain them in uniform abutting, non-overlapping relation by the elasticity of the material when there is no pressure in the housing. A retaining ring in the bore holds the valve in place and engages the outer radial ends of the hollow ribs to prevent the latter from expanding under air pressure and enabling the slits to open uniformly.

7 Claims, 12 Drawing Figures

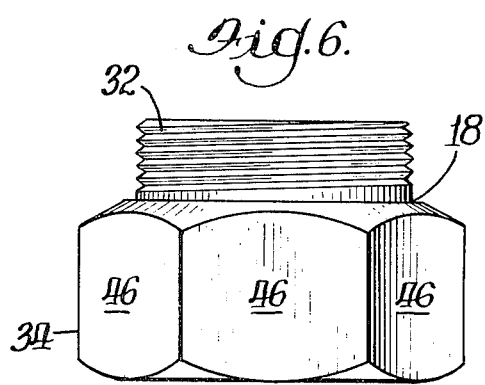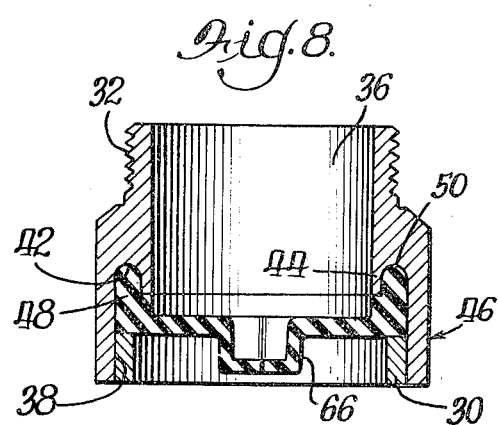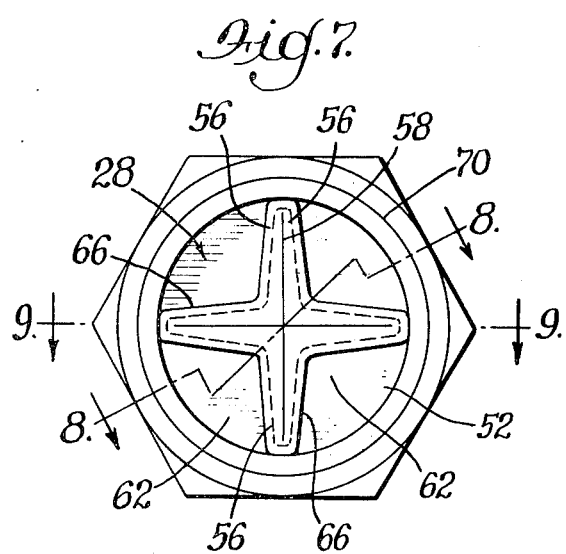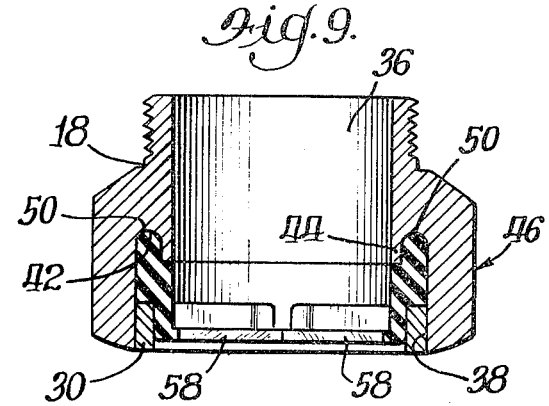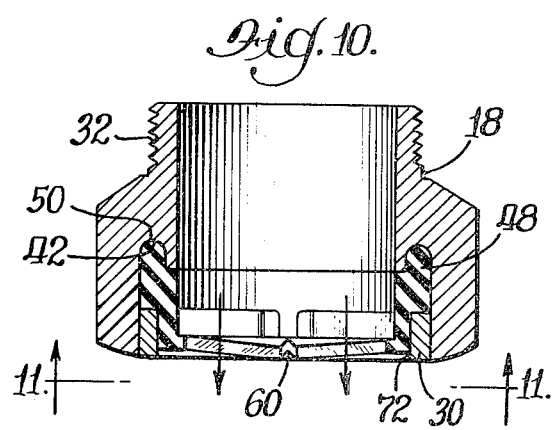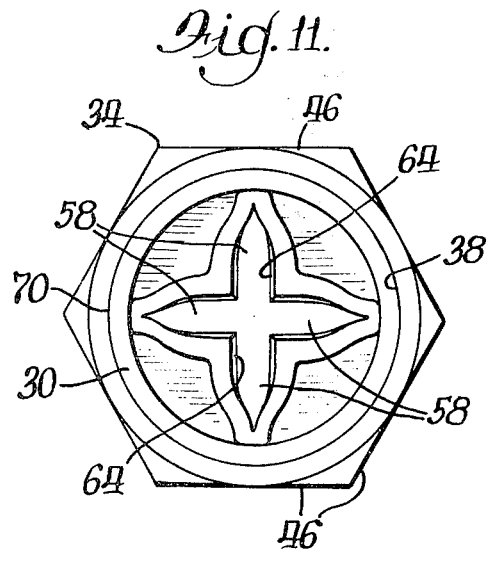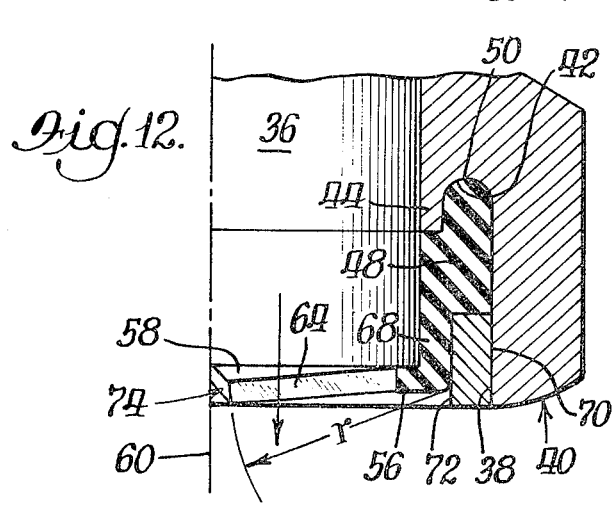

WASP EXCLUDER AND EXHAUST PORT PROTECTOR FOR AIR BRAKES

BACKGROUND OF THE INVENTION

The present invention provides a wasp excluder and exhaust port protector which effectively excludes wasps and other insects, is automatically self-clearing of nests, mud, wax, and ice that may collect on the outside, and provides straight through discharge of air with minimal back pressure and resistance to flow.

Another object is to provide a wasp excluder and exhaust port protector of extreme simplicity and small size which is inexpensive to manufacture consisting of only three easily assemblable parts with no screws, pins, washers or rivets which might easily be lost.

A specific object of the invention is to provide a wasp excluder having a housing in which a radially-slitted valve disc or rubber-like material of special design is held in an outlet bore of the housing by a retaining ring.

A special feature of the invention is in the shape of and the support for the rubber-like valve which is formed with a plurality of radial, internally concave, externally convex, hollow ribs, all meeting in a recess at the center, and radial slits extending through the body along the middles of the ribs and meeting in the center of the disc to define a plurality of elastic sectors which open when air pressure is applied from within; and the other radial end portions of the hollow ribs are engaged by the retaining ring to prevent radial expansion under pressure and to cause the slits to be opened uniformly by air flow.

BRIEF DESCRIPTION OF THE DRAWINGS

Other objects and advantages will be apparent from the following description taken in connection with the drawings in which:

FIG. 6 is a side view of the embodiment shown in the previous figures;

FIG. 7 is a bottom view of FIG. 6;

FIG. 8 is a vertical cross-sectional view taken along line 8—8 of FIG. 7;

FIG. 9 is a view similar to FIG. 8 taken along line 9—9 of FIG. 7;

FIG. 10 is a view similar to FIG. 9 showing the unit in open condition discharging air;

FIG. 11 is a bottom view of FIG. 10 taken in the direction of arrows 11—11; and

FIG. 12 is a fragmentary enlarged view of FIG. 11.

Like parts are designated by like reference characters throughout the drawings.

DETAILED DESCRIPTION OF THE PREFERRED EMBODIMENT

Figure 1:
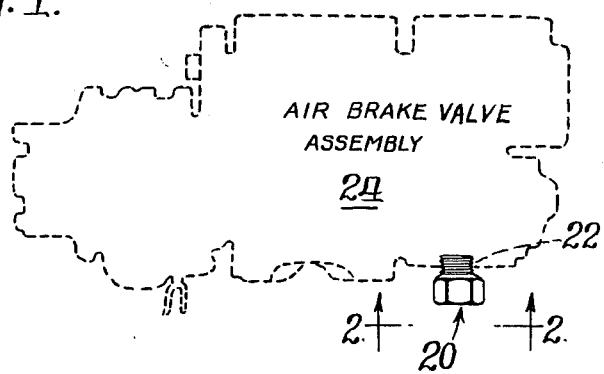
FIG. 1 is a side view of a conventional air brake valve assembly in broken lines showing a preferred form of a wasp excluder and exhaust port protector illustrating the present invention.

Referring now in detail to the preferred embodiment shown in the drawings, the wasp excluder and exhaust port protector generally designated 20 is shown in FIG. 1 as it would be screwed into an internally threaded exhaust port 22 of an air brake assembly 24 represented in broken lines.

Figure 3:
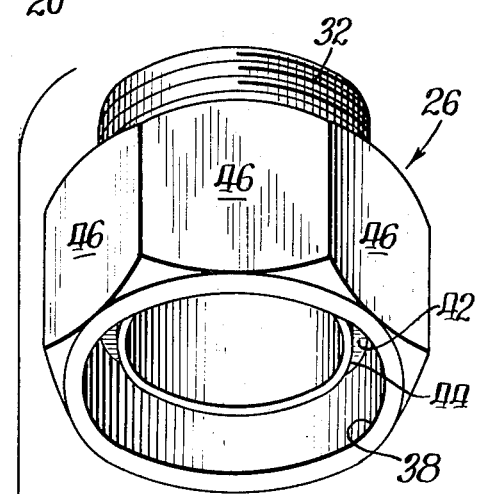
FIG. 3 is an exploded perspective view of FIG. 2 showing the three major components consisting of the housing, valve, and retaining ring.
Figure 3:
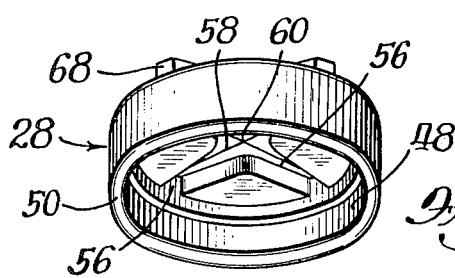

As best shown in FIG. 3, the wasp excluder and exhaust port protector 20 comprises three major components, namely, a housing 26, valve 28, and retaining ring 30.

The housing 26 is made of metal or other suitable material providing the requisite strength for this application. It has an inlet portion 32 with external threads engageable with the exhaust port threads 22 and an outlet portion 34 having a passageway 36 therebetween. A cylindrical bore 38 is formed in the outlet portion extending between the outer end 40 of the housing 18 inward to the annular seat 42 adjacent the internal skirt 44. The outer portion 34 has an external hexagonal surface with flats 46 to facilitate engagement by a wrench.

The valve 28 is molded or cast in a unitary body of rubber-like material such as "neoprene" elastomer material and it is wholly contained within the bore 38 behind the outlet end surface 40 of the housing to provide mechanical protection for it. The rubber-like body of the valve 28 consists of a ring portion 48 fitted within the bore 38. A rounded annular inner end portion 50 is seated in fluid sealing engagement against the seat 42. The valve has a disc portion generally designated 52 integral with the ring 48 and extending across the bore 38 which, as will be seen from the drawings, comprises an extension of the passageway 36.

Figure 4:
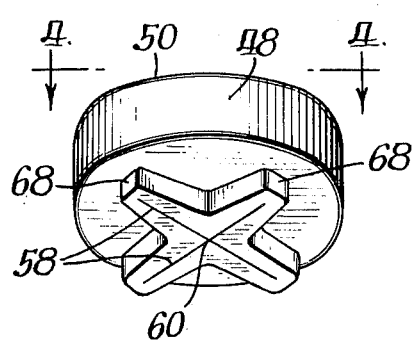
FIG. 4 is a perspective view of the valve component shown in FIG. 3, viewed from the top side in the direction of arrows 4—4.

The disc portion 52 is formed with a plurality, in this case four, of radial, internally concave, externally convex, hollow ribs 56. As shown in FIGS. 3, 4 and 7, there are four ribs 56 extending radially from the center of the valve and equally circumferentially spaced at 90°. As shown in FIG. 4, each rib 56 is internally concave, that is, concave facing the interior of the housing. As shown in, among others, FIGS. 3 and 7, each rib 56 is externally convex, that is, the lower or external surface is convex.

Radial slits 58 are provided completely through the rubber-like valve material wall extending along the middles of the ribs 56. They meet at the center 60 (FIGS. 2, 3 and 7) which is also the longitudinal axis of the housing. These slits extend most of the way out toward the ring portion 48 (see FIG. 12). The slits 58 split each rib 56 longitudinally in half and define a plurality of elastic sectors 62 connected along their radially outer margins to the ring portion 48. Due to the elasticity of the rubber-like material, the edge surfaces 64 (FIG. 12) of the sectors along each slit are normally closed into an edgewise abutment condition in the absence of pressure in the housing. This normally closed condition, shown for instance in FIGS. 2, 8 and 9, blocks access from the outside into the passageway 36, thereby preventing wasps or other insects from entering the housing and likewise preventing ice from getting in and blocking the housing.

Each sector is flexible to a degree determined by the rubber-like material employed, and the sectors have integral reinforcing ridges 66 (comprising the side walls of the ribs 56) extending along the edges 64 defined by the slits 58. These ridges 66 are set back from the slits and from the apexes of the sectors to provide relatively thin and flexible marginal wall portions between these reinforcing ridges and the slits to facilitate sealing in the normally closed condition. Each outer radial end of each rib 56 is closed by a wall 68 which is supported by the retaining ring as will be described.

The annular retaining ring 30 is rectangular in cross section as shown enlarged in FIG. 12. Its outer cylindrical wall 70 is formed to provide a press fit with the bore 38 to hold the valve assembled as shown. The inner cylindrical surface 72 of the retaining ring engages the radially outer end walls 68 of the ribs 56. This prevents the ribs from expanding outwardly (and possibly non-uniformly) when pressure inside the housing deflects the sectors to release exhaust air. Thus, as shown in FIG. 11, the slits 58 will be opened uniformly during discharge.

Figure 2:
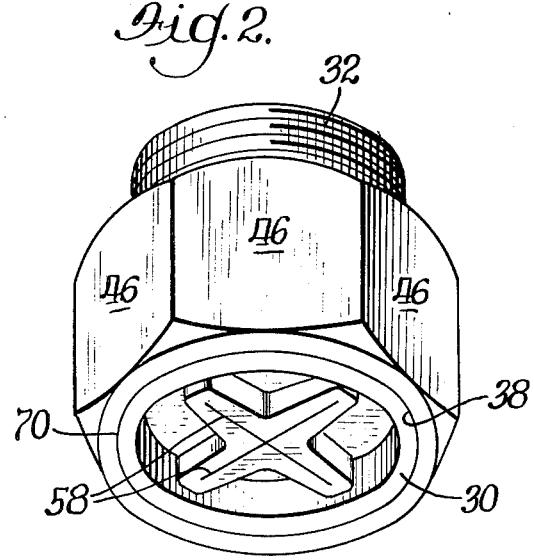
FIG. 2 is an enlarged perspective bottom view of the wasp excluder and exhaust port protector shown in FIG. 1 taken generally in the direction of the arrows 2—2, the unit being shown in normally closed condition.
Figure 5:
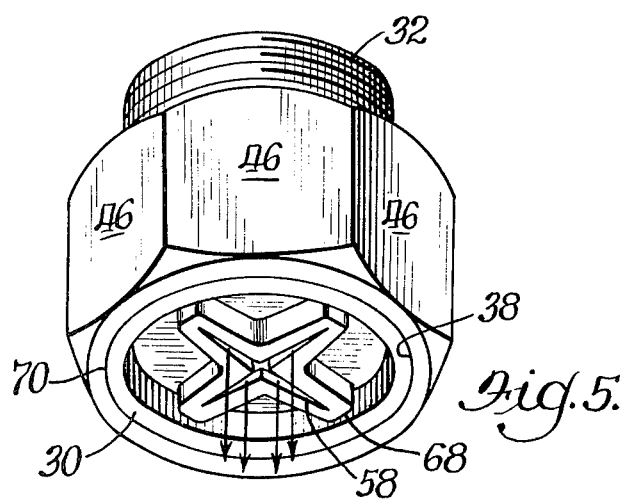
FIG. 5 is a view similar to FIG. 2 showing the wasp excluder and exhaust port protector in an open condition discharging air from the air brake assembly.

Use and operation are believed obvious in view of the foregoing description. Briefly, when no air is being discharged, the wasp excluder and exhaust port protector 20 will be in normally closed position such as shown in FIG. 2, preventing access to the interior by wasps and other insects, ice, mud and other agents. When air is discharged, the sectors 62 are uniformly deflected, and the slits 58 are uniformly opened as shown in FIGS. 5 and 11. Assuming some wax or mud has been deposited on the outside surface of the valve body 28, this will be broken off and dislodged as the air begins to flow. This is facilitated in the present invention by, on the one hand, the central portion of the valve body being flat, and, on the other hand, the outer end walls 68 being restrained against outer radial movement by the inner surface 72 of the retaining ring 30.

Considering the condition, stated above, where the outer surface of the valve 28 is covered with mud, wax or ice, these materials are all of a class which are weaker in tension than they are in shear or compression. Thus, it takes less force to break or dislodge them by pulling them apart than by cutting or crushing them. This is taken advantage of in the present invention by reason of the fact that the slitted central portion of the valve body is substantially flat. Thus, as pressure begins to build up in the housing at the instant that air discharge commences, the inner apex corners 74 will be deflected outward in the direction of the axis of the housing, while the slits are separated as shown in FIG. 11. This pulls apart by tension any material which may be overlying the slits and the accompanying blast of air dislodges it. At the same time that the foregoing action is occurring, the apexes 74 (FIG. 12) are being deflected generally about a radius $r$ while being restrained from outer radial movement by the retaining ring 30, thereby causing all slits 58 to open uniformly as shown in FIG. 11.

While a specific preferred embodiment of the invention has been described, it will be apparent to those skilled in the art that other specific constructions are possible within the scope and spirit of the invention.

The embodiments of the invention in which an exclusive property or privilege is claimed are defined as follows:

1. A wasp excluder and exhaust port protector for air brakes comprising:
   a housing having inlet and outlet end portions with a passageway therebetween, said inlet end portion having means for connection to an exhaust port of an air brake system, said outlet end portion having an outlet bore with an outwardly open end;
   a valve having a generally flat disc shaped body of rubber-like material recessed within said outlet end portion to provide mechanical protection therefor from external flying objects such as railroad ballast, said valve body engaging and filling said outlet bore adjacent said outwardly open end to exclude the accumulation of solids between said disc-shaped body and said outlet bore;
   said body being integrally formed with a plurality of axially outwardly extending hollow elongated protuberances which are radially oriented to meet at the center of the disc, the protuberances being substantially U-shaped in cross-section with a relatively thin flat bottom,
   each of said protuberances having a longitudinally extending slit through its bottom wall centrally thereof, the slits meeting in the center of the body and defining a plurality of elastic sectors sealingly engaged in edgewise abutment along the slits by the elasticity of the material to prevent entrance into and blockage of said passageway by outside agents such as wasps and ice, said body being deflectible by internal air pressure to axially outwardly deflect said elastic sectors and open said slits toward said outwardly open end to thereby dislodge any accumulation of solids on the outer surface thereof and enable flow of air through said passageway, the outer surface of said hollow protrusions being within but adjacent the outlet end portion,
   whereby initial opening of said slits by air pressure is characterized by outward angular deflection of said sectors and simultaneous separation of edges of said sectors along the slits to dislodge material collected thereon.

2. A wasp excluder and exhaust port protector for air brakes according to claim 1 in which said protuberances have outer radial ends radially aligned with the respective slits, said radial ends abutting said housing during deflection of said sectors by internal pressure to thereby limit radially outward displacement of said protuberances and slits and cause said slits to open uniformly.

3. A wasp excluder and exhaust port protector for air brakes comprising:
   a housing having inlet and outlet end portions with a passageway therebetween, said inlet end portion having means for connection to an exhaust port of an air brake system, said outlet end portion having a cylindrical bore forming a continuation of said passageway and extending between an inner annular seat and the outer end of said housing;
   a valve having a unitary body of rubber-like material wholly contained within said bore to provide mechanical protection therefor from external flying objects such as railroad ballast;
   said body having a ring portion slidably fitted within said bore and sealingly engaging said seat, and having a substantially flat disc portion integral with the ring portion engaging and filling said bore adjacent said outwardly open end to exclude the accumulation of solids between said disc portion and said bore, said disc portion being transverse to said passageway and formed with a plurality of radial, internally concave, externally convex, hollow ribs projecting axially from said disc portion, and radial slits extending through said body along the middles of said ribs and meeting in the center of the disc portion to define a plurality of elastic sectors connected to said ring portion and sealingly engaged with one another in edgewise abutment along said slits, the outer surfaces of said ribs being adjacent but within the outwardly open end, said sectors being normally closed by the elasticity of the rubber-like material to block access from the outside to said passageway, and said sectors being outwardly displaceable by air pressure from within to enable flow through said passageway.

4. A wasp excluder and exhaust port protector for air brakes according to claim 3 having a retaining ring within said bore externally of said valve to hold the latter in place.

5. A wasp excluder and exhaust port protector for air brakes according to claim 4 in which said retaining ring engages and supports the radial outer end portions of said radial hollow ribs to prevent radial expansion of said ribs and enable uniform opening of said slits by air pressure within said passageway.

6. A wasp excluder and exhaust port protector for air brakes comprising:
   a housing having inlet and outlet end portions with a passageway therebetween, said inlet end portion having means for connection to an exhaust port of an air brake system, said outlet end portion having a cylindrical bore forming a continuation of said passageway and extending between an inner annular seat and the outer end of said housing;
   a valve having a unitary body of rubber-like material wholly contained within said bore to provide mechanical protection therefor from external flying objects such as railroad ballast;
   said body having a ring portion slidably fitted within said bore and sealingly engaging said seat, and having a disc portion integral with the ring portion filling said bore closely adjacent said outwardly open end to exclude the accumulation of solids between said disc portion and said bore, said disc portion being transverse to said passageway and formed with a plurality of radial, internally concave, externally convex, hollow ribs, and radial slits extending through said body along the middles of said ribs and meeting in the center of the disc portion to define a plurality of elastic sectors connected to said ring portion and sealingly engaged with one another in edgewise abutment along said slits, said sectors being normally closed by the elasticity of the rubber-like material to block access from the outside to said passageway, and said sectors being outwardly displaceable by air pressure from within to enable flow through said passageway, and a retaining ring within said bore externally of said valve to hold the latter in place, said retaining ring engaging and retaining the radial outer end portions of said radial hollow ribs to prevent radial expansion of said ribs and enable uniform opening of said slits by air pressure within said passageway.

7. A wasp excluder and exhaust port protector for air brakes according to claim 6 in which said radial hollow ribs have closed radial ends engaged with the retaining ring at uniform circumferentially spaced locations about the center of the disc portion.

* * * * *

UNITED STATES PATENT OFFICE
CERTIFICATE OF CORRECTION

PATENT NO. : 3,957,078
DATED : May 18, 1976
INVENTOR(S) : Emil J. Hlinsky

It is certified that error appears in the above-identified patent and that said Letters Patent are hereby corrected as shown below:

Column 1, line 19, "or" should be -- of --

Column 1, line 29, "other" should be -- outer --

Signed and Sealed this

Twenty-first Day of September 1976

[SEAL]

Attest:

RUTH C. MASON
*Attesting Officer*

C. MARSHALL DANN
*Commissioner of Patents and Trademarks*